US008251623B2

(12) United States Patent
Marechal

(10) Patent No.: US 8,251,623 B2
(45) Date of Patent: Aug. 28, 2012

(54) SYSTEM FOR FIXING A SEAT, IN PARTICULAR AN AIRCRAFT SEAT, AND SEAT INCLUDING SUCH A SYSTEM

(75) Inventor: Xavier Marechal, Paris (FR)

(73) Assignee: Attax, Carrieres-sur-Seine (FR)

( * ) Notice: Subject to any disclaimer, the term of this patent is extended or adjusted under 35 U.S.C. 154(b) by 134 days.

(21) Appl. No.: 12/576,877

(22) Filed: Oct. 9, 2009

(65) Prior Publication Data

US 2010/0090060 A1      Apr. 15, 2010

(30) Foreign Application Priority Data

Oct. 10, 2008   (FR) ...................................... 08 56869

(51) Int. Cl.
*B61D 45/00* (2006.01)

(52) U.S. Cl. ...................................................... 410/105

(58) Field of Classification Search .................. 410/104, 410/105, 77, 80; 224/118.1, 118.6, 122 R; 248/503.1

See application file for complete search history.

(56) References Cited

U.S. PATENT DOCUMENTS

| 4,062,298 | A | * | 12/1977 | Weik | 410/105 |
| 4,496,271 | A | * | 1/1985 | Spinosa et al. | 410/105 |
| 4,708,549 | A | * | 11/1987 | Jensen | 410/105 |
| 6,902,365 | B1 | * | 6/2005 | Dowty | 410/105 |
| 7,438,511 | B2 | * | 10/2008 | Legeay | 410/105 |
| 7,837,145 | B2 | * | 11/2010 | Wodak | 244/118.6 |

FOREIGN PATENT DOCUMENTS

EP          1 762 490 A1    3/2007

* cited by examiner

*Primary Examiner* — H Gutman

(74) *Attorney, Agent, or Firm* — Sughrue Mion, PLLC

(57) ABSTRACT

Provided is a system for fixing a seat in an aircraft, the system including a movable base and slide. The base and slide include a device for hooking into a rail of the aircraft, by movement of the slide between an assembly/disassembly and a hooking position, using a lever articulated on the base and the slide by rods. The lever is movable between a retracted position for assembly/disassembly and an active hooking position, wherein a hook-shaped device of the lever co-operate with a retaining member that is provided at one end of a resilient member. The resilient member is associated with unlocking device that includes a cams which are rotatable in the base and capable of being actuated so as to move the retaining device towards a release position for the hook-shaped device.

9 Claims, 4 Drawing Sheets

SYSTEM FOR FIXING A SEAT, IN PARTICULAR AN AIRCRAFT SEAT, AND SEAT INCLUDING SUCH A SYSTEM

The present invention concerns a system for fixing a seat, in particular for an aircraft, and a seat including such a system.

In the prior art, for example from the document EP-A-1 762 490, a system of this type is already known which comprises a base connected to the seat and associated with a slide movable therein.

The base and the slide are equipped with means for hooking into a fixing rail of the aircraft, by movement of the slide between a position for assembly/disassembly and a position for hooking the system into the rail, by means of an operating lever articulated on the base and the slide by articulation rods.

The lever is movable by a user between a retracted position for assembly/disassembly and an active position for hooking on the system, in which the hook-shaped means of the lever co-operate with means for retaining the lever in a locking position, which are provided at one end of a resilient locking member, the other end of which is associated with the base.

The resilient locking member is then associated with unlocking means comprising cam means rotatably mounted in the base and capable of being actuated so as to move the resilient member, and therefore the retaining means of the latter, towards a release position for the hook-shaped means of the lever.

Figure 2:
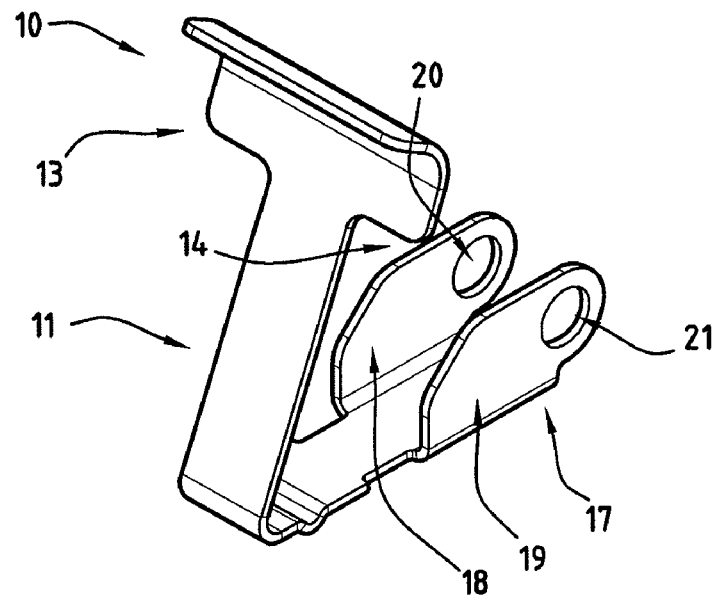

An exploded view of such a system is provided in FIG. 2 of this prior document, in which it can be seen that the end of the resilient locking member associated with the base in fact includes a hole for the passage of a screw for fixing this end of the member onto the base.

However, tests have shown that such a structure had a certain number of drawbacks, in particular by reason of the vibrations to which this system is subjected and which result in loosening of the screw.

Besides the fact that the resilient member is then no longer held in position correctly on the base, the screw may also become completely detached from the base and possibly cause jamming of the system.

Moreover, also in this prior document, the cam means rotatable in the base are in the form of a rod having a cam flat and capable of being actuated by the user by means of a key.

Tests have also shown that repeated and uncontrolled operation of the rod could cause deformation or even breakage of the resilient member.

The aim of the invention is therefore to solve these problems.

To this end, the subject of the invention is a system for fixing a seat, in particular for an aircraft and movable therein, the base and the slide being equipped with means for hooking into a fixing rail of the aircraft, by movement of the slide between a position for assembly/disassembly and a position for hooking the system into the rail, by means of an operating lever articulated on the base and the slide by articulation rods, the lever being movable by a user between a retracted position for assembly/disassembly and an active position for hooking on the system, wherein the hook-shaped means of the lever co-operate with means for retaining the lever in the locking position, which are provided at one end of a resilient locking member, the other end of which is associated with the base, the resilient locking member being associated with unlocking means comprising cam means rotatably mounted in the base and capable of being actuated so as to move the resilient member, and therefore the retaining means of the latter, towards a release position for the hook-shaped means of the lever, characterized in that the resilient member is in the general shape of a recumbent V, one of the ends of which includes the retaining means and the other end of which includes pierced lateral lugs, intended to be engaged around the rod for articulation of the lever on the base in order to connect the resilient member to the base.

According to other aspects of the invention, the system for fixing a seat comprises one or more of the following features:
   the resilient member is produced by cutting out and deforming a side of sheet metal;
   the system includes means for limiting the rotation of the cam means in the base;
   the limiting means comprise a flat forming an abutment of the cam means, adapted to co-operate with complementary abutment surfaces of a stop member fixed on the base;
   the stop member has at one end the abutment surfaces and at the other end a hole for mounting the stop member around the rod for articulation of the lever on the base;
   the stop member is disposed between the lateral lugs of the resilient member on the opposite side of the cam means from the resilient member;
   the cam means are formed by a cam flat of a rod engaged in the base and the end of the rod for introduction into the base includes a flat for the passage of the rod behind the resilient member during its assembly in the base; and
   the retaining means for the end of the resilient member are in the form of laterally protruding wings, each adapted to co-operate with a hook of the operating lever.

According to another aspect, the invention also has as its subject a seat including such a system.

Figure 1:
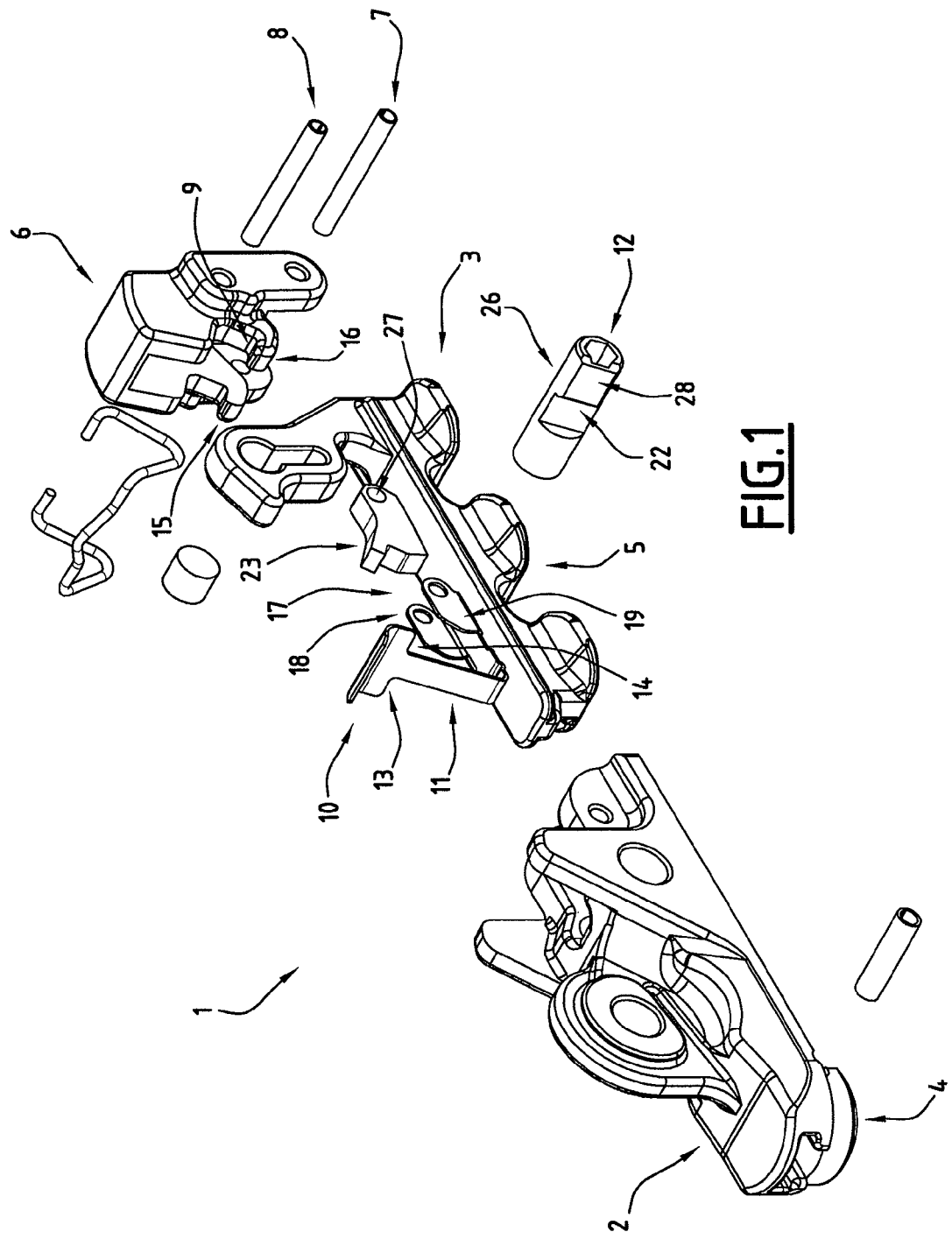
Figure 4:
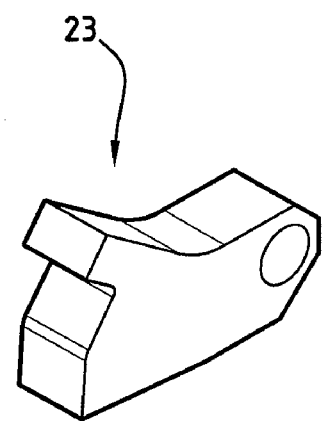
Figure 3:
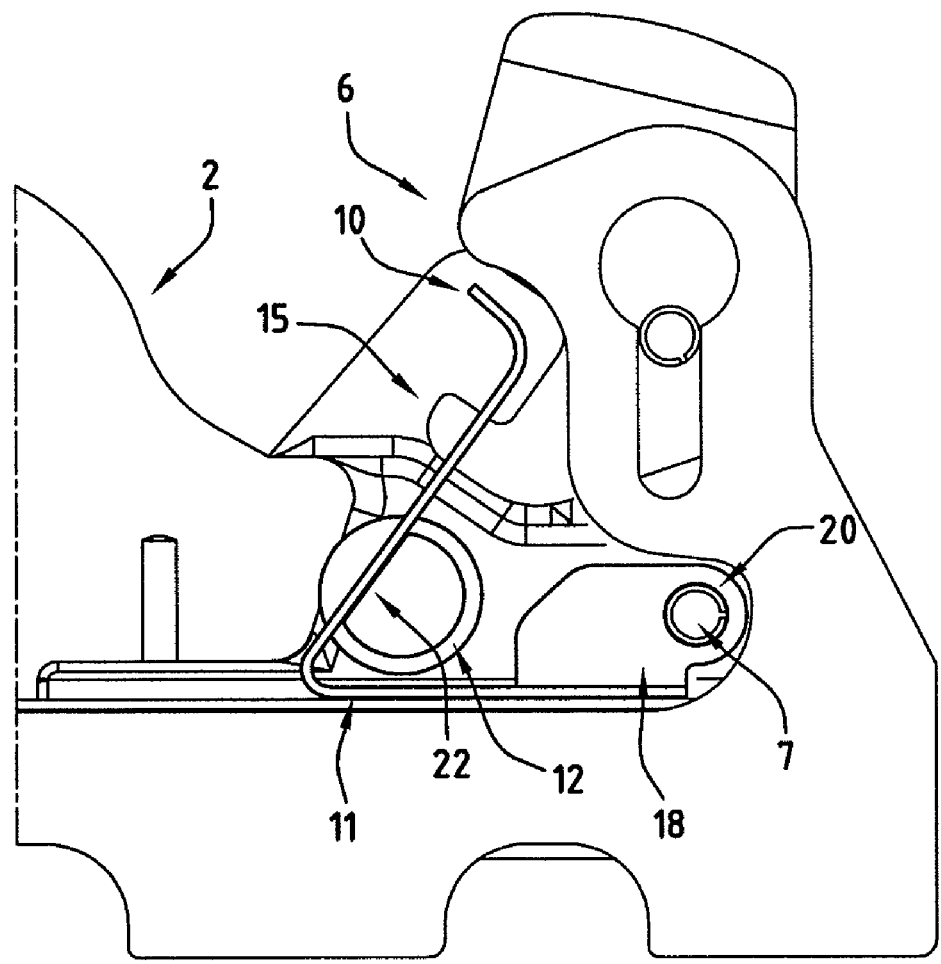
Figure 5:
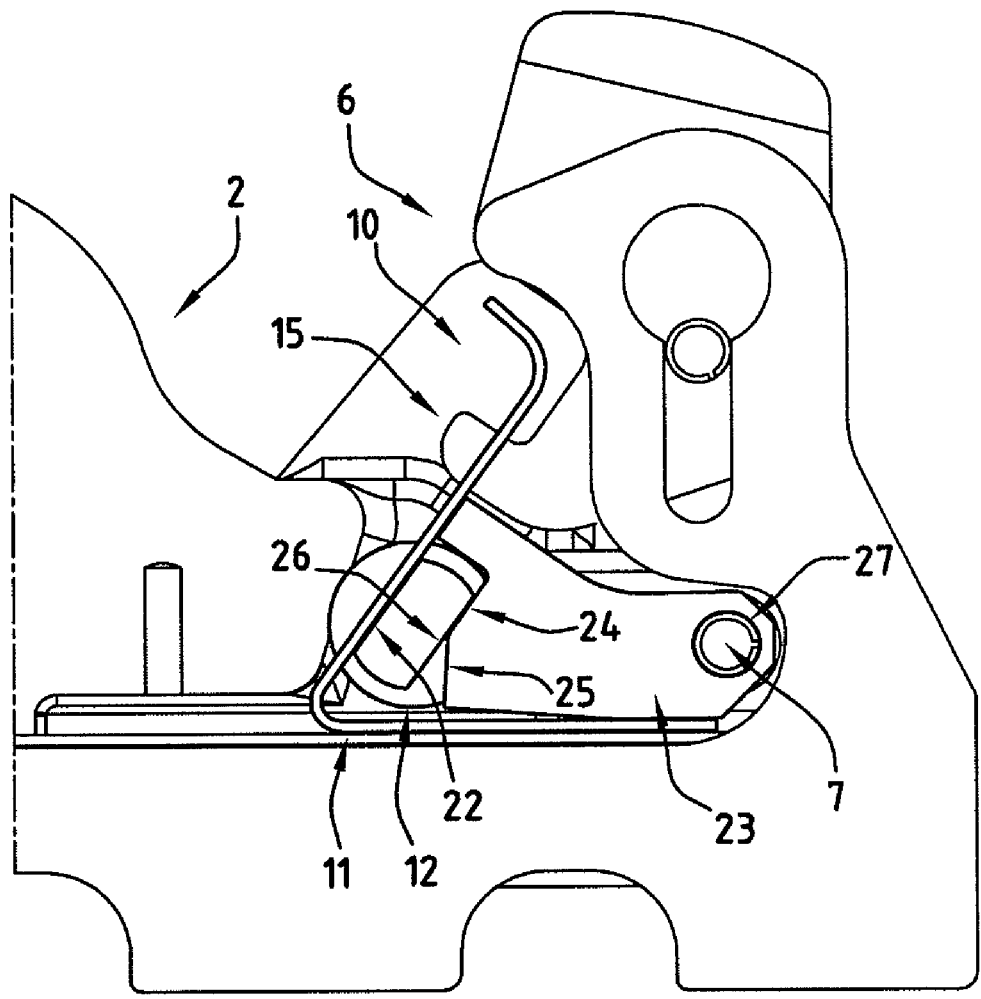

The invention will become clearer from the following description, provided solely by way of example and with reference to the appended drawings, in which:

FIG. 1 shows an exploded perspective view of a fixing system according to the invention, FIG. 2 shows a perspective view of a resilient locking member forming part of such a system, FIG. 3 shows a view on an enlarged scale of a detail of a fixing system according to the invention, illustrating the installation of the resilient member, FIG. 4 shows a perspective view of means for limiting the rotation of cam means forming part of a system according to the invention; and FIG. 5 shows a view on an enlarged scale of the installation of the limiting means.

In these Figures, and in particular in FIG. 1, a fixing system for a seat, in particular for an aircraft, is shown.

The system is designated by the general reference 1 in these drawings and comprises a base designated by the general reference 2, connected to the seat and associated with a slide movable therein, the slide being designated by the general reference 3.

The base and the slide are equipped with means for hooking into a fixing rail (not shown) of the aircraft, the hooking means being designated respectively by the general references 4 and 5 in FIG. 1, by moving the slide between a position for assembly/disassembly and a position for hooking the system into the rail.

The movement of the slide is obtained by means of an operating lever designated by the general reference 6, articulated on the base and the slide by articulation rods, respectively 7 and 8.

The lever is then movable by a user between a retracted position for assembly/disassembly and an active position for hooking on the system, in which the hook-shaped means of the lever, which are designated by the general reference 9, co-operate with means for retaining the lever in the locking position. The retaining means are designated by the general reference 10 in these drawings and are provided at one end of a resilient locking member designated by the general reference 11, the other end of which is associated with the base.

In addition, the resilient locking member 11 is associated with unlocking means comprising cam means rotatably mounted in the base and capable of being actuated so as to move the resilient member, and therefore the retaining means of the latter, towards a release position for the hook-shaped means of the lever in order to release the latter.

The unlocking means are designated by the general reference 12 in FIG. 1.

The general operation of such a fixing system is similar to that described in the document EP-A-1 762 490 mentioned previously, i.e. once the system is engaged in the rail, the user moves the operating lever 6 in order to cause the slide 3 to be moved relative to the base 2 and to fix the seat onto the rail, the hook-shaped means 9 of the lever then co-operating with the retaining means 10 of the resilient member 11. When the user wishes to disassemble the system, he actuates the unlocking means 12, for example by means of a key, in order to push back the resilient member, and in particular the retaining means 10 of the latter, so as to release the hook-shaped means of the lever in order to permit the movement of the latter towards a retracted position.

In the fixing system according to the invention, the resilient member 11, as illustrated in FIGS. 1, 2, 3 and 5, has the general shape of a recumbent V, one end of which includes the retaining means 10 and the other end of which includes pierced lateral lugs intended to be engaged around the rod for articulation of the lever on the base in order to connect the resilient member to the base.

In the drawings can be seen the resilient member 11 in the general shape of a V, one end of which includes the retaining means 10 which are in the form of laterally protruding wings 13 and 14, imparting to this end of the resilient member a general T-shape. The lateral wings are each adapted to co-operate with a hook of the operating lever 6, respectively 15, 16, in the locking position of the lever. The other end 17 of the resilient member has the lateral lugs, respectively 18 and 19, each provided with a hole, respectively 20 and 21, and which are therefore adapted to be engaged around the rod 7 for articulation of the lever 6 in the base 2 in order to be associated with the base.

Such a resilient member may for example be produced by cutting out and deforming a side of sheet metal.

Such a structure thus makes it possible to avoid using a fixing screw as in the prior document mentioned previously, in order to solve the problems of loosening of the screw and of the risk of jamming of the system.

As indicated, the system according to the invention also includes unlocking means 12 comprising cam means rotatably mounted in the base 2 and capable of being actuated so as to move the resilient member 11, and therefore the retaining means 10 of the latter, towards a release position for the hook-shaped means of the lever 6.

The unlocking means are for example in the form of a rod 12 mounted to be rotatable in the base. As illustrated in more detail in FIGS. 3 and 5, the rod 12 includes a cam flat, designated by the general reference 22 and adapted to push back a corresponding limb of the resilient member 11 during the operation of the rod 12.

In order to avoid the problems of degradation mentioned with respect to the system of the prior art, in the system according to the invention means are provided for limiting the rotation of the rod, and therefore of the cam means, in the base.

As illustrated in FIGS. 1, 4 and 5, the limiting means comprise a stop member fixed on the base and designated by the general reference 23. The stop member is in fact disposed between the lateral lugs 18 and 19 of the resilient member 11 on the opposite side of the cam means from the resilient member and has at one end abutment surfaces, respectively 24 and 25, which are adapted to co-operate with a complementary abutment flat of the cam means 12, the abutment flat being designated by the general reference 26.

The cam flat and abutment flat of the rod 12 are arranged on either side of the latter.

At the other end, the stop member 23 has a hole 27 for mounting it around the rod 7 for articulation of the lever on the base in order to fix the stop member onto the base. The hole is then aligned with the holes of the lateral lugs 18 and 19 of the resilient member 11 in order to allow the passage of the articulation rod 7.

It will then be seen that the stop member makes it possible to limit the angular movements of the rod 12, the abutment flat 26 thereof bearing against the complementary abutment surfaces 24 or 25 of the stop member 23 in order to define limit position for the rotation of the rod.

The rod 12, as illustrated in particular in FIG. 1, then includes the cam flat 22, the abutment flat 26 on the opposite side from the cam flat 22, and its end for introduction into the base 2 also has a flat for the passage of the rod behind the resilient member during its assembly/disassembly in the base, the passage flat being designated by the general reference 28 in FIG. 1.

In a conventional manner, the ends of the rod are equipped with impressions for receiving any type of operating key, capable of being manipulated by a user so as to effect the movement of the resilient member towards the unlocking position for the lever in order to allow the system to be disassembled.

It is of course to be understood that still further embodiments may be envisaged.

The invention claimed is:

1. A system for fixing a seat in an aircraft comprising:
a base (2) connected to the seat and associated with a slide (3) movable therein, the base and the slide being equipped with means (4,5) for hooking into a fixing rail of the aircraft, by movement of the slide (3) between a position for assembly and disassembly and a position for hooking the system into the rail, by means of an operating lever (6) articulated on the base and the slide by articulation rods (7, 8), the operating lever (6) being movable between a retracted position for assembly and disassembly and an active position for fixing the seat to the aircraft,
wherein a hook-shaped member (9) on the lever (6) co-operate with a retainer for retaining the lever in a locked position, the hook-shaped member is provided at one end of a resilient locking member (11), the other end of the resilient locking member is associated with the base, the resilient locking member (11) is also associated with unlocking means (12) comprising cam means (22) rotatably mounted in the base and capable of being actuated so as to move the resilient member to a position that releases the hook-shaped member, wherein the resilient member (11) has a recumbent V shape of which one end includes a retaining member and an other end includes pierced lateral lugs (18, 19) configured to engage around the rod (7) for articulation of the lever (6) on the base (2) in order to connect the resilient member to the base.

2. The system for fixing a seat according to claim 1, wherein the resilient member comprises sheet metal which is produced by cutting out and deforming a side of sheet metal blank.

3. The system for fixing a seat according to claim 1, further comprising means (23, 24, 25, 26) for limiting the rotation of the cam means (12) in the base.

4. The system for fixing a seat according to claim 3, wherein the limiting means comprise a flat forming an abutment (26) of the cam means (12), adapted to co-operate with complementary abutment surfaces (24, 25) of a stop member (23) fixed on the base.

5. The system for fixing a seat according to claim 4, wherein the stop member (23) has at one end the abutment surfaces (24, 25) and at the other end a hole (27) for mounting the stop member (23) around the rod (7) for articulation of the lever (6) on the base (2).

6. The system for fixing a seat according to claim 5, wherein the stop member (23) is disposed between the lateral lugs (18, 19) of the resilient member (11) on the opposite side of the cam means from the resilient member.

7. The system for fixing a seat according to claim 1, wherein the cam means are formed by a cam flat (22) on a second rod (12) engaged in the base (2) and in that the end for introduction of the second rod (12) into the base includes a flat (28) for the passage of the second rod (12) behind the resilient member (11).

8. The system for fixing a seat according to claim 1, wherein the retaining means for the end of the resilient member (11) are in the form of laterally protruding wings (13, 14), each adapted to co-operate with a hook (15, 16) of the operating lever.

9. An aircraft, comprising the system for fixing the seat system according to claim 1.

\* \* \* \* \*